United States Patent [19]

Dinger

[11] 3,942,807

[45] Mar. 9, 1976

[54] SEALING ARRANGEMENT

[75] Inventor: Hans Dinger, Friedrichshafen, Germany

[73] Assignee: Motoren- und Turbinen-Union Friedrichshafen GmbH, Germany

[22] Filed: Sept. 28, 1973

[21] Appl. No.: 401,846

[30] Foreign Application Priority Data

Sept. 29, 1972 Germany .......................... 2248039

[52] U.S. Cl. ........... 277/180; 277/235 B; 123/41.84

[51] Int. Cl.[2] ........................................ F16J 15/08

[58] Field of Search ................ 277/235 B, 180, 236; 123/41.84, 41.83; 92/144, 171, 169

[56] References Cited

UNITED STATES PATENTS

| | | | |
|---|---|---|---|
| 3,215,442 | 11/1965 | Papenguth | 277/180 |
| 3,363,608 | 1/1968 | Scherenberg et al. | 123/41.84 |
| 3,448,986 | 6/1969 | Jelinek et al. | 277/235 B |
| 3,463,056 | 8/1969 | Moore et al. | 123/41.84 |
| 3,568,573 | 3/1971 | Bailey et al. | 123/41.84 |
| 3,800,751 | 4/1974 | Glassey et al. | 92/171 |

*Primary Examiner*—Richard E. Aegerter
*Assistant Examiner*—L. Footland
*Attorney, Agent, or Firm*—Craig & Antonelli

[57] ABSTRACT

A sealing arrangement within the area of the joint surfaces between cylinder head, inserted cylinder liner with cylinder liner flange and cylinder crankcase of a water-cooled internal combustion engine in which a recessed fit is provided at the cylinder head for the accommodation of the cylinder liner flange; a flat seal is thereby arranged on the joint surface between the cylinder-crankcase and the cylinder head and the flange of the cylinder liner as well as the cylinder head rest on the flat seal; the transmission of the contact pressure onto the cylinder liner flange thereby takes place by direct contact with the cylinder head.

15 Claims, 1 Drawing Figure

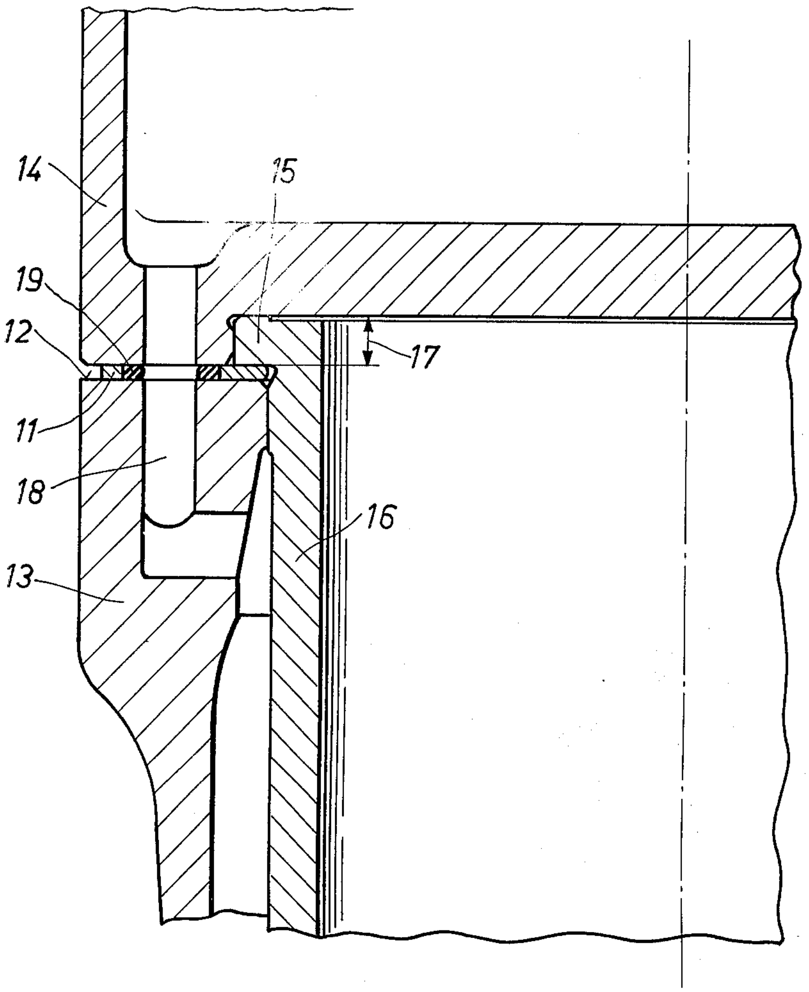
14
15
19
12
17
11
18
16
13

SEALING ARRANGEMENT

This arrangement relates to a sealing arrangement within the area of the joint surfaces between the cylinder head, the cylinder liner, and the cylinder-crankcase of a water-cooled internal combustion engine with inserted cylinder liners having a collar or flange, whereby a fitting recess is provided at the cylinder head for receiving the cylinder liner collar.

The purpose of any such sealing arrangement for the described area is to assure the safe and reliable sealing of the various media, such as, for example, cooling water, lubricating oil, and combustion gases, with respect to one another under all operating conditions.

In a prior art sealing arrangement, the combustion space is sealed off by a sealing ring on the cylinder liner flange, made, for example, of soft iron, while the water jacket is sealed off by an O-ring on the shoulder of the cylinder liner and the liquid passages are sealed off by plug-in tubes with O-rings at the joint surfaces between the cylinder-crankcase and the cylinder head. The location of the sealing surfaces of the cylinder head relative to the cylinder liner collar and to the cylinder crankcase with respect to one another represents a type of double fit as regards achieving a sufficient sealing effect. For this reason, it is necessary in this prior art sealing arrangement to maintain within narrow limits during the manufacture the tolerances of three dimensions at three structural parts, namely, the thickness dimension of the cylinder liner flange, the thickness dimension of the sealing ring, and the depth dimension of the recessed fit within the cylinder head, which makes the manufacture of the parts considerably more expensive.

The soft iron gasket requires a large surface pressure for sealing off the combustion chamber. In contrast thereto, the surface pressure may be lower, or can even become zero on the joint surface of the cylinder head with the cylinder-crankcase, because the liquid openings are sealed off by the O-rings, by means of which also a gap between the joint surfaces can additionally be sealed off. Since it is not possible for constructional reasons to make the cylinder head absolutely resistant to bending, deformations of the cylinder head result due to forces occuring during operation so that micro-movements occur between the cylinder head and the cylinder-crankcase on the joint surface with the cylinder-crankcase. As a result thereof, a so-called frictional corrosion is initiated which destroys the surfaces and requires expensive refinishing operations on the joint surfaces.

The present invention is therefore concerned with the task of providing a sealing arrangement which avoids the above-described disadvantages and is simple and inexpensive.

This task is solved in accordance with the present invention in that a flat-seal is arranged on the joint surfaces between the cylinder-crankcase and the cylinder head and both the flange of the cylinder liner as well as the cylinder head abut on the flat-seal and the transmission of the contact pressure onto the cylinder liner flange takes place by direct contact with the cylinder head.

In order to be able to absorb the high contact surface pressure which is required for sealing off the combustion chamber between the cylinder head and the cylinder liner and also becomes effective between the cylinder liner flange and the cylinder-crankcase, the flat-seal consists, in accordance with this invention, of metal, preferably of aluminum.

For purposes of sealing off the liquid openings between the cylinder crankcase and the cylinder head, elastic sealing rings are arranged in the flat-seal according to the present invention.

According to a further feature of the present invention, the elastic sealing rings which may consist, for example, of rubber sealing rings, are non-detachably mounted in the flat-seal to avoid losing the same and project beyond the flat-seal on both sides by a slight amount, whereby a completely satisfactory seal is obtained at these places.

The advantages attained by the present invention consist in particular in that the sealing arrangement is able to get along with only a single part, that this flat-seal permits a repeated disassembly of the cylinder head without refinishing, that the surface pressure at the joint surfaces of the cylinder-crankcase within the area of the cylinder liner flange is effectively reduced by means of the flat-seal by reason of the effect of the pressure cone which results from the thickness of the flat-seal, and thus the danger of crack formation at the cylinder-crankcase is lessened within the area of the cylinder liner flange, and that the joint surfaces of the cylinder-crankcase and the cylinder head are no longer damaged by frictional corrosion, because the latter affects only the softer flat-seal and thus an expensive refinishing of the joint surfaces is dispensed with.

Accordingly, it is an object of the present invention to provide a sealing arrangement within the area of the joint surfaces between cylinder head, cylinder liner and cylinder crankcase in a water-cooled internal combustion engine with inserted cylinder liner which avoids by simple means the aforementioned shortcomings and drawbacks encountered in the prior art.

Another object of the present invention resides in a sealing arrangement within the area of the joint surfaces between cylinder head, inserted cylinder liner and cylinder crankcase which assures a sufficient seal under all operating conditions by extremely simple means.

A further object of the present invention resides in a sealing arrangement of the type described above for internal combustion engines which considerably reduces the cost of manufacture of the various parts and permits the repeated disassembly of the cyliner head from the cylinder crankcase without the need for replacement of the seal and/or without the need for refinishing the surfaces thereof.

Still another object of the present invention resides in a sealing arrangement for internal combustion engines within the area of the joint surfaces between cylinder head, inserted cylinder liner and cylinder crankcase which effectively eliminates the so-called friction corrosion and thus dispenses with the need of costly refinishing operations at the joint surfaces.

These and other objects, features and advantages of the present invention will become more apparent from the following description when taken in connection with the accompanying drawing which shows, for purposes of illustration only, one embodiment of a sealing arrangement in accordance with the present invention, and wherein:

The single FIGURE is a cross sectional view of a sealing arrangement according to the present invention within the area of the joint surfaces between the cylinder head, the cylinder crankcase and the cylinder liner.

Referring now to the single FIGURE of the drawing, a flat-seal 11 is arranged on the joint surface 12 between the cylinder crankcase 13 and the cylinder head 14. Both the flange 15 of the cylinder liner 16 as well as the cylinder head 14 rest on the flat-seal means 11. The cylinder head 14 is secured onto the cylinder crankcase in a conventional manner by means of cylinder head bolts. The transmission of the contact pressure onto the cylinder liner flange 15 takes place by direct contact with the cylinder head 14.

The height 17 of the cylinder liner flange 15 and the depth of the corresponding fitting recess in the cylinder head 14 are so matched to each other that the surface pressure at the cylinder liner flange 15, with a predetermined pretensioning of the cylinder head bolts, is always larger by a multiple than the surface pressure between the cylinder head 14 and the flat-seal means 11. In order to be able to absorb the high surface pressure which is required for sealing off the combustion chamber between the cylinder head 14 and the cylinder liner 16 and which is also effective between the cylinder liner flange 15 and the cylinder crankcase 13, the flat-seal means 11 consists, according to this invention, of a metal, preferably of aluminum, whereby a repeated disassembly of the cylinder head is possible without the need for replacing the flat-seal 11.

As a result of the pressure cone which results from the thickness of the flat-seal 11 within the area of the cylinder liner flange 15, the effective contact area on the joint surface 12 of the cylinder crankcase 13 is increased, whereby the surface pressure at this area is effectively reduced and the danger of crack formation at the cylinder crankcase 13 is lessened within the area of the cylinder liner flange 15.

At the locations of liquid passage openings 18, such as, for example, for cooling water, elastic sealing rings 19, for example, rubber rings, are vulcanized into the flat-seal 11 and are thus fixedly mounted against possible loss. A completely satisfactory sealing effect is attained in that the sealing rings 19 project beyond the flat-seal 11 on both sides by a small amount.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A sealing arrangement within the area of the joint surface means between cylinder head, cylinder liner and cylinder-crankcase of an internal combustion engine equipped with inserted cylinder liners provided with a flange, a fitting recess being provided at the cylinder head for accommodating the cylinder liner flange, characterized in that a flat seal means is arranged on the joint surface means between cylinder-crankcase and cylinder head and in that both the flange of the cylinder liner as also the cylinder head rest on the flat seal means, the transmission of the contact pressure onto the cylinder liner flange taking place by direct contact with the cylinder head.

2. A sealing arrangement according to claim 1, characterized in that the flat seal means essentially consists of metal.

3. A sealing arrangement according to claim 2, characterized in that the flat seal means consists of aluminum.

4. A sealing arrangement according to claim 3, characterized in that the internal combustion engine is a water-cooled internal combustion engine.

5. A sealing arrangement according to claim 4, characterized by the provision of elastic sealing ring means in the flat seal means at the places of liquid passage openings for the cooling water.

6. A sealing arrangement according to claim 5, characterized in that the elastic sealing ring means are rubber rings.

7. A sealing arrangement according to claim 5, characterized in that the elastic sealing ring means are fixedly secured in the flat seal means to avoid loss thereof and project beyond the flat seal means on both sides by a slight amount.

8. A sealing arrangement for a water-cooled internal combustion engine according to claim 1, characterized by the provision of elastic sealing ring means in the flat seal means at the places of liquid passage openings for the cooling liquid.

9. A sealing arrangement according to claim 8, characterized in that the elastic sealing ring means are fixedly secured in the flat seal means to avoid loss thereof and project the flat seal means on both sides by a slight amount.

10. A sealing arrangement according to claim 1, wherein said direct contact between said liner means flange and said cylinder head is seal-free.

11. A sealing arrangement for an internal combustion engine comprising:

a cylinder head, a cylinder-crankcase, and cylinder liner means arranged to provide facing joint surfaces, and seal means arranged between the joint surfaces in sealing engagement therewith, wherein a cylinder liner means flange and the cylinder head constitute one of said joint surfaces and the cylinder-crankcase constitutes the other of said joint surfaces.

12. A sealing arrangement according to claim 10, wherein said flange contacts said cylinder head in a seal-free manner.

13. A sealing arrangement according to claim 10, wherein said seal means is a single seal means.

14. A sealing arrangement according to claim 10, wherein said flange and said cylinder head rest on one side of said seal means while said cylinder-crankcase is provided on a side of said seal means opposite said one side.

15. A sealing arrangement according to claim 14, wherein a height of said flange and a depth of a recess in said cylinder head for receiving said flange are so matched to each other that the surface pressure at the flange, with a predetermined pretensioning of cylinder head bolts, is always larger by a multiple that the surface pressure between the cylinder head and the seal means.

* * * * *